June 4, 1957  M. A. BEDICS  2,794,221
SEALING GASKET AND METHOD OF MAKING IT
Filed Feb. 25, 1954  2 Sheets-Sheet 1

INVENTOR
Michael A. Bedics
BY
ATTORNEY

June 4, 1957   M. A. BEDICS   2,794,221
SEALING GASKET AND METHOD OF MAKING IT
Filed Feb. 25, 1954   2 Sheets-Sheet 2

INVENTOR
Michael A. Bedics
BY
ATTORNEY

United States Patent Office 2,794,221
Patented June 4, 1957

2,794,221

SEALING GASKET AND METHOD OF MAKING IT

Michael A. Bedics, Poughquag, N. Y., assignor to Pawling Rubber Corporation, Pawling, N. Y., a corporation of Delaware Application February 25, 1954, Serial No. 412,503

6 Claims. (Cl. 20—69)

This invention relates to gaskets and more particularly to cushion gaskets ordinarily employed between the complementary surfaces of a closure door or lid and a cabinet or chest and the method of forming the gaskets from a strip of conventional cushion gasket material.

More specifically, the invention relates to a one-piece, tubular or solid cushion gasket of rubber or the like in linear form, and the method of forming a selected length of the same into a unitary angular configuration having corner inserts integral therewith and corresponding to the particular contour of the corner portions of a door or lid to which it is to be attached.

The invention has particular application to gaskets of rubber or the like material which when extruded or otherwise produced, cannot be readily re-shaped, patched or otherwise altered subsequently without impairing its surface and structural strength.

Heretofore, cushion gasket material was formed to fit about the doors of refrigerators or the lids of deep-freeze chests, for example, by cutting a plurality of wedge-shape pieces out of the gasket material inwardly from one margin thereof while leaving the opposite margin intact at spaced points, corresponding to the four corner areas of such doors or lids, and suitably joining the opposite free ends of the gasket material whereby the notched portions of the gasket conform to the rounded corners of such doors or lids when the gasket is attached thereto in known manner.

In the case of hollow cushion gaskets for similar doors or lids having square corners, four appropriate lengths of similar gasket material were mitered by hand at their respective opposite ends to permit formation of 90 degree angles therebetween, and the mitered ends subsequently spliced together on a dimensionally fixed form or jig by angular metal pins, vulcanizing tape, cement and/or ty-gum to join and strengthen the square corners so made.

The foregoing examples of forming rectangular gaskets, as specified, from one or more selected strips of tubular gasket material of extruded rubber or the like, had certain disadvantages in that the first example resulted in stressed, non-symmetrical weak corners due to the stretching of the outer radius of the rounded corners so formed; predetermined dimensional tolerances were difficult to maintain, and manufacturing costs excessive.

The second example was subject to further disadvantages in that it resulted in excessive waste of gasket material, due to the mitering of the opposite ends of the several lengths utilized, to form the respective sides of a rectangular gasket, and the variation in color shade therebetween since two sides of a gasket are often taken from one production run of gasket material and the remaining two sides from a subsequent run.

Accordingly, it is an object of the invention to provide a unitary cushion gasket of the character specified which is not subject to the above noted disadvantages.

Another object of the invention is to provide a unitary, rectangular cushion gasket of the character specified which is dimensionally uniform throughout.

A further object of the invention is to provide a unitary, rectangular cushion gasket of the character specified wherein the outer marginal edge of the gasket is increased in length relative to the inner marginal edge thereof by means of marginal inserts formed integral therewith.

Another object of the invention is to provide a unitary, rectangular gasket of the character specified wherein its respective corner portions constitute an unstressed, non-mutilated continuation of the respective opposite ends and sides of the gasket.

A further object of the invention is to provide a unitary, rectangular cushion gasket of the character specified wherein the outer marginal edge portion of the gasket includes a plurality of equally spaced, wedge-shape inserts integral with and forming the respective corner portions thereof.

Another object of the invention is to provide a unitary, rectangular cushion gasket of the character specified wherein the inner marginal edge at each of its corner portions is intact and the outer marginal edge opposite thereto includes a gusset-like insert integral therewith.

Various other objects, advantages and novel features of the invention will become apparent from the following detailed description.

The invention resides in the method of gasket construction, the unitary gasket structure, and the combinations and angular insert features hereinafter described and claimed.

For an understanding of the invention and for an illustration of several forms thereof, including conventional forms in contrast thereto, reference is to be had to the accompanying drawings in which.

Figure 12:
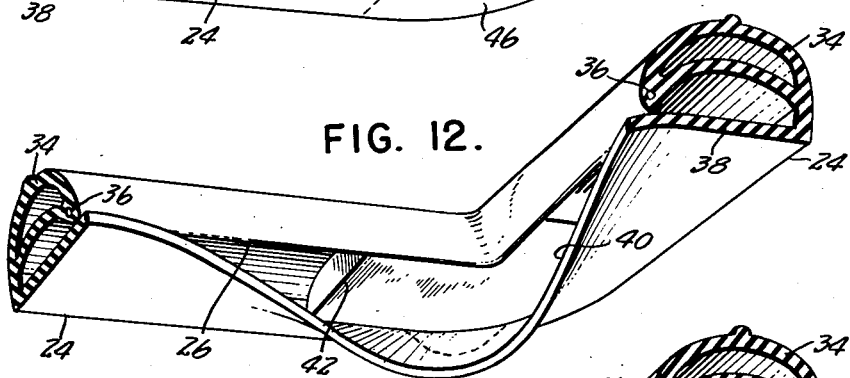
Fig. 12 is a fragmentary perspective view similar to Fig. 11 and illustrating the manner in which the lowermost of the pair of angular core members is subsequently removed from a completed corner portion.
Figure 13:
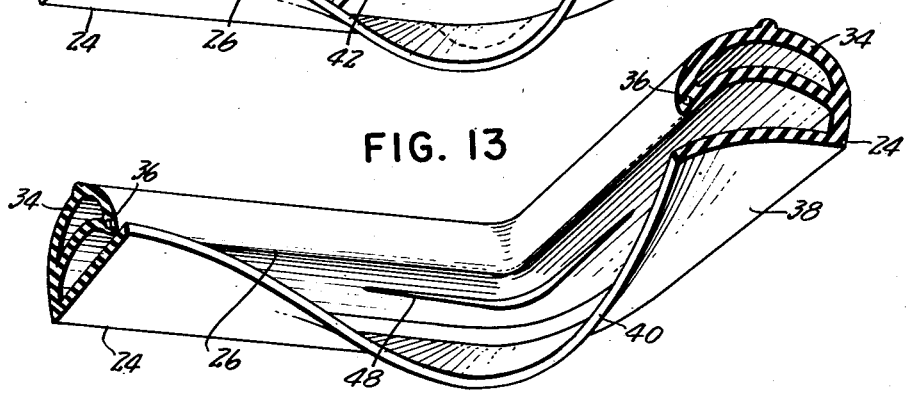
Figure 14:
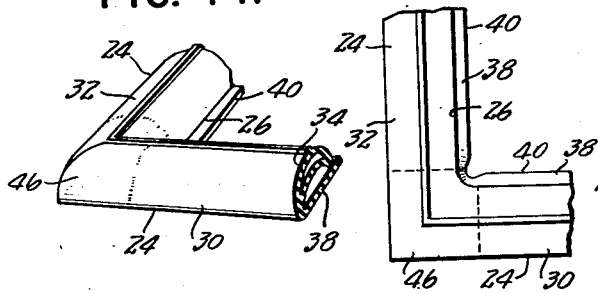
Figure 15:
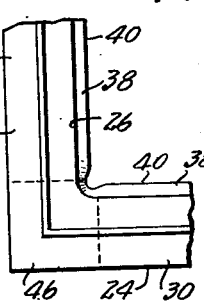

Fig. 13 is a fragmentary perspective view similar to Fig. 12, and illustrating the manner of removing the uppermost angular core member from within the tubular corner portion formed in accordance with the invention; and Figs. 14 and 15 are fragmentary views illustrating a square corner portion formed in the open corner of an angular gasket section by means of core members having square outer marginal edge portions.

Figure 1:
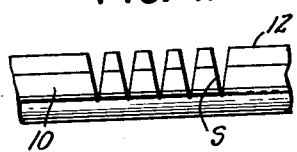
Figs. 1 and 2 are fragmentary elevational views illustrating a conventional manner of fitting a strip of gasket material about the rounded corners of a door or lid.
Figure 2:
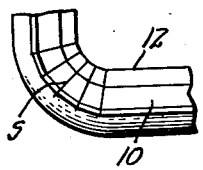

Referring to the drawings, Figs. 1 and 2 illustrate fragmentary portions of an angular cushion gasket 10 wherein the linear length of the inner marginal edge 12 has been reduced relative to its outer marginal edge in a manner as practiced heretofore. The radial lines of severance S, as seen in Fig. 2, not only produce a structurally weak corner portion but, when under stress, will gradually be extended outwardly toward the unsevered marginal edge thereof in the form of cracks.

Figure 3:
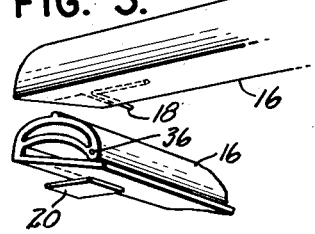
Fig. 3 is a fragmentary perspective view illustrating a conventional manner of joining the mitered ends of separate strips of gasket material to form a square corner therebetween.
Figure 4:
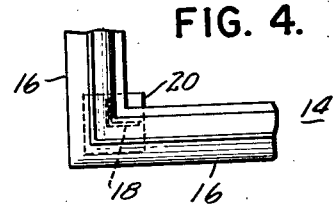
Fig. 4 is a fragmentary top plan view illustrating a completed square corner joint made in accordance with Fig. 3.

As shown in Figs. 3 and 4, a similar angular gasket 14 having square corners, was formed heretofore from a plurality of separate pieces 16 of gasket material which were each mitered at their opposite ends to a definite length, and a fixed juncture subsequently effected between the respective mitered ends by means of angular pins 18, cement, vulcanizing tape 20, and/or ty-gum to produce a unitary endless gasket.

However, square corner junctures effected as in Figs. 3 and 4, were also defective in that such corner portions did not have the same structural strength as the intermediate portion of the angularly disposed sections 16, but also developed cracks inwardly of and normal to the joined mitered end faces of the respective sections 16 of gasket material, by the repeated application of pressure on such corner portions.

Figure 5:
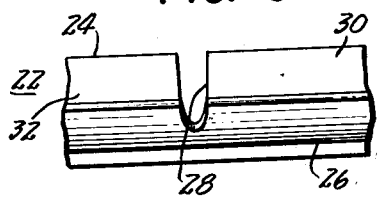
Fig. 5 is a top plan view of a fragmentary section of a single strip of cushion gasket material illustrating the manner of cutting out marginal edge portions thereof in accordance with the invention.
Figure 6:
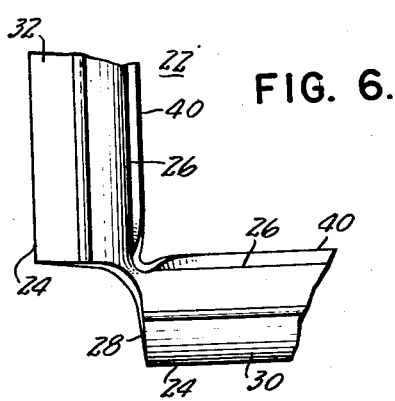
Fig. 6 is a fragmentary top plan view illustrating the partially severed section of Fig. 5, in angular form.
Figure 7:
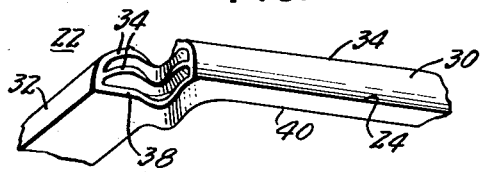
Fig. 7 is a fragmentary perspective view of the angular section shown in Fig. 6, illustrating the open ends of the angularly disposed ends with the inner marginal edge portion thereof intact.

In accordance with the invention and as shown in Figs. 5, 6 and 7, a strip of similar tubular gasket material 22 of rubber or the like extruded material and of a predetermined length, is employed to produce a unitary angular gasket, as hereinafter described, in which cracks, separations or the like and structural weakness of the corners thereof are avoided.

Referring more particularly to Fig. 5, a plurality of sections, of predetermined shape and size, are cut out of the strip 22 of tubular gasket material, inwardly from one marginal edge 24 thereof to a point short of its opposite marginal edge 26, at spaced points thereon, as indicated at 28, whereby to divide the strip 22, for example, into two pairs of sections 30 and 32 of different length which remain intact or connected at their marginal edge portion 26 to form the non-mutilated inner marginal edge portion of the unitary rectangular gasket.

With the length of gasket material so altered at spaced points thereon, it is placed on a form or jig, of the same size as the door or lid to which the completed gasket is to be attached, by arranging its partially severed sections 30 and 32 in angular relation thereon, as exemplified in Fig. 6, and effecting a permanent juncture between the respective free ends of the strip 22 of tubular gasket material in known manner.

As shown in Fig. 7, the strip 22 of gasket material employed for the purpose of the invention is of such cross-sectional configuration as to provide a concavo-convex tubular portion 34, having a small orifice 36 formed within and throughout its marginal edge portion 26 (utilized heretofore for receiving the ends of the angular pins 18 in Fig. 3) and a flat, base web or flange 38, underlying the tubular portion 34 and integral with the opposite marginal edge 24 thereof, the free marginal edge 40 of the underlying flange 38 extending slightly beyond the marginal edge 26 of the tubular portion 34 as in Fig. 6.

Figure 8:
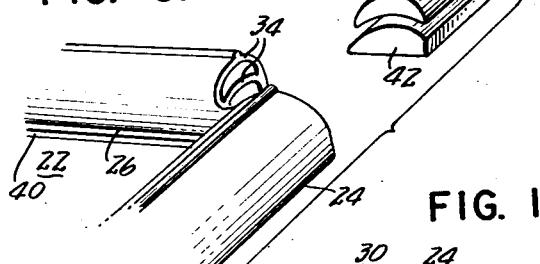
Figs. 8 and 9 are fragmentary perspective views of an angular section of gasket material formed in accordance with the invention and illustrating a pair of angular core members and the manner of positioning the same between the partially severed ends thereof.
Figure 9:
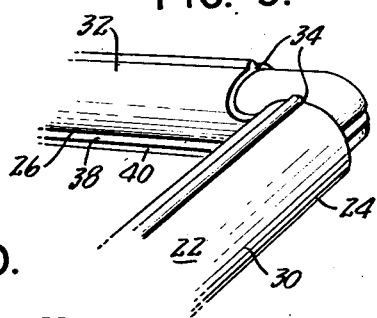
Figure 10:
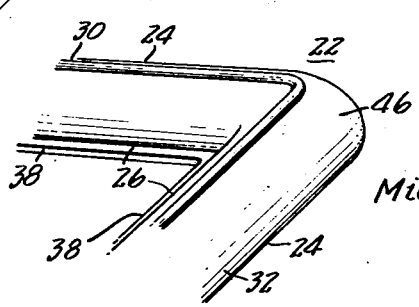
Figs. 10 and 11 are similar fragmentary perspective views illustrating a completed corner insert portion integral with the angular disposed sides of an angular unitary gasket.

In accordance with the invention, and as best shown in Figs. 8, 9 and 10, the strip 22 of gasket material, after its respective free ends have been permanently joined together, corner gussets or inserts 42 are formed therein integral with and in continuation of the outer marginal edge portion 24 of the respective partially connected pairs of sections 30 and 32 forming the sides of a completed rectangular gasket in a manner now to be described.

As seen in Fig. 8, a pair of short, angular, metallic core members 42 of concavo-convex configuration in cross-section and having a curved or square corner forming outer marginal edge portion 44, are inserted, one in and between the adjacent, angularly disposed open ends of the tubular portion 34 of the gasket, and the other core member 42 with its opposite ends under the adjacent open ends of the tubular portions 34 and the adjacent angularly disposed ends of the base flange 38.

With the respective core members 42 properly positioned in superposed spaced relation in and between the adjacent angularly disposed open ends of the partially severed gasket forming sections 30 and 32, as viewed in Fig. 9, uncured, rubber-like sheet material is disposed on, between and under the exposed core surfaces and subsequently subjected to heat and pressure in a suitable vulcanizing mold or form to produce corner portion 46 integral with and in continuation of the base flange and outer marginal edge portions of the tubular sides defining the angular gasket, whereby symmetrical corners having substantially the same unstressed configuration in cross-section and compressive resistance as that of the straight sides of the gasket are produced thereon.

Figure 11:
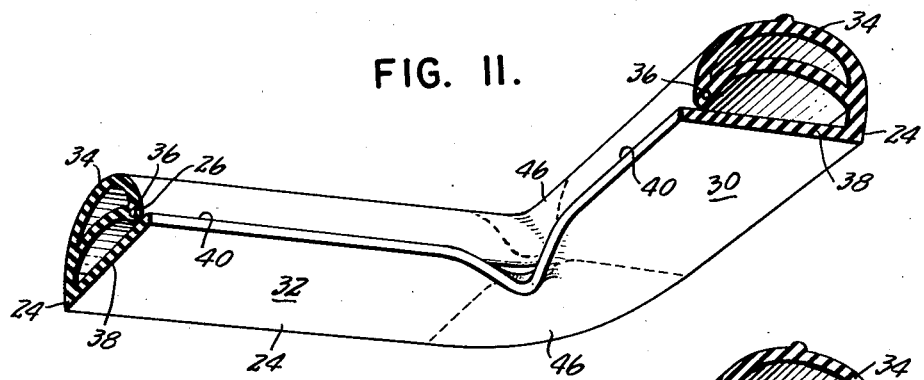

Subsequent to the curing of corner portions 46 integral with the respective sides including the base flange 38, defining the unitary cushion gasket 22, as exemplified in Figs. 10 and 11, the lowermost of each pair of core members 42 is removed from the gasket by deflecting the free marginal edge portion 40 of the base flange 38 in the manner illustrated.

The uppermost of each pair of core members 42, which was completely enclosed in the corner forming operation, is subsequently withdrawn from within the tubular portion 34 of the gasket 22, at its respective corner portions by slitting the underside of the tubular portion, as indicated at 48 in Fig. 13, whereby the uppermost core member may be removed through the slit.

While the corner portions 46 formed on the gasket 22, as above described, have a rounded or curved marginal edge portion, square corners may likewise be formed thereon, as exemplified in Figs. 14 and 15, by merely substituting angular core members, as in Fig. 8, having square outer marginal edge portions, since it is conceivable that a gasket for a refrigerator door may have rounded corners at its upper end and square corners at its bottom end. Moreover, the present invention may be practiced with gasket material in strip form having cross-sectional configurations other than that herein illustrated and described.

While the invention has been described with respect to a certain preferred example which gives satisfactory results, it will be understood by those skilled in the art after understanding the invention, that various changes and modifications may be made without departing from the spirit and scope of the invention and it is intended therefore in the appended claims to cover all such changes and modifications.

I claim:

1. A corner joint of rubber or like material having legs of cured extruded strip of said material comprising inner and outer marginal edges wherein the inner marginal edge of the jointed corner is a non-mutilated element of the extruded strip continuous with said legs and wherein substantially the corner sector of said joint progressing outwardly from the non-mutilated inner marginal edge is comprised of a rubber or like bonding material in the cured but non-extruded form.

2. A tubular corner joint of rubber or like material having legs of cured extruded tubular strip of said material comprising inner and outer marginal edges wherein the inner marginal edge of the jointed corner is a non-mutilated element of the extruded strip continuous with said legs and wherein substantially the corner sector of said joint progressing outwardly from the non-mutilated inner marginal edge is comprised of a rubber or like bonding material in the cured but non-extruded form.

3. A corner joint of rubber or like material having in cross-section a hollow, concavo-convex configuration and having legs of said cross-sectional configuration of cured extruded strip comprising inner and outer marginal edges wherein the inner marginal edge of the jointed corner is a non-mutilated element of the extruded strip continuous with said legs and wherein substantially the corner sector of said joint progressing outwardly from the non-mutilated inner marginal edge is comprised of a rubber or like bonding material in the cured but non-extruded form.

4. A unitary, polygonally-shaped cushion gasket of cured extruded rubber or like material having inner and outer marginal edges and having strongly jointed corners wherein the inner marginal edge of each of the jointed corners is a continuous, non-mutilated element of the extruded gasket material and wherein substantially the corner sector of each jointed corner progressing outwardly from the non-mutilated marginal edge is comprised of a rubber or like bonding material in the cured but non-extruded form.

5. A unitary, polygonally-shaped cushion gasket of cured extruded rubber or like tubular material having inner and outer marginal edges and having strongly jointed tubular corners wherein the inner marginal edge of each of the jointed corners is a continuous, non-mutilated element of the extruded gasket material and wherein substantially the corner sector of each jointed corner progressing outwardly from the non-mutilated inner marginal edge is comprised of a rubber or like bonding material in the cured but non-extruded form.

6. A unitary, polygonally-shaped cushion gasket of cured extruded rubber or like material having in cross-section a hollow, concavo-convex configuration and having inner and outer marginal edges, said gasket comprising strongly jointed corners of said cross-sectional configuration wherein the inner marginal edge of each of the jointed corners is a continuous, non-mutilated element of the extruded gasket material and wherein substantially the corner sector of each jointed corner progressing outwardly from the non-mutilated inner marginal edge is comprised of a rubber or like bonding material in the cured but non-extruded form.

References Cited in the file of this patent
UNITED STATES PATENTS

| Number | Name | Date |
|---|---|---|
| 2,217,875 | Nauert | Oct. 15, 1940 |
| 2,263,831 | Welch | Nov. 25, 1941 |
| 2,278,756 | Wright | Apr. 7, 1942 |
| 2,364,962 | Eagles | Dec. 12, 1944 |
| 2,503,882 | Medford | Apr. 11, 1950 |
| 2,566,151 | Wright | Aug. 28, 1951 |
| 2,683,679 | Hurd et al. | July 13, 1954 |